US008731916B2

(12) United States Patent
Li et al.

(10) Patent No.: US 8,731,916 B2
(45) Date of Patent: May 20, 2014

(54) ONLINE DISTORTED SPEECH ESTIMATION WITHIN AN UNSCENTED TRANSFORMATION FRAMEWORK

(75) Inventors: Deng Li, Redmond, WA (US); Jinyu Li, Redmond, WA (US); Dong Yu, Kirkland, WA (US); Yifan Gong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/948,935

(22) Filed: Nov. 18, 2010

(65) Prior Publication Data

US 2012/0130710 A1 May 24, 2012

(51) Int. Cl.
*G10L 21/02* (2013.01)
(52) U.S. Cl.
USPC .......................................................... 704/226
(58) Field of Classification Search
CPC .... G10L 15/20; G10L 15/142; G10L 21/0208
USPC .......................................................... 704/226
See application file for complete search history.

(56) References Cited

U.S. PATENT DOCUMENTS

| 7,165,028 | B2 | 1/2007 | Gong | |
| 7,617,098 | B2 * | 11/2009 | Deng et al. | 704/226 |
| 2007/0033034 | A1 * | 2/2007 | Yao | 704/244 |
| 2008/0059190 | A1 | 3/2008 | Chu | |
| 2010/0076759 | A1 * | 3/2010 | Shinohara et al. | 704/233 |

OTHER PUBLICATIONS

Jinyu Li et al.: "A unified framework of HMM adaptation with joint compensation of additive and convolutive distortions"—Published Date: Feb. 14, 2009, pp. 1-17 http://research.microsoft.com/pubs/80028/JAC-CSL2009.pdf.
Yifan Gong: "A Method of Joint Compensation of Additive and Convolutive Distortions for Speaker-Independent Speech Recognition"—Published Date: Sep. 2005, pp. 1-9. http://ieeexplore.ieee.org/stamp/stamp.jsp?tp=&arnumber=1495479.
VTS Approximation of the Velocities and Accelerations of Noisy Speech—Published Date: Sep. 2006, pp. 1-254 http://www.google.co.uk/url?sa=t&source=web&cd=6&ved=0CC0OFiAF&url=http%3A%2F%2Fwww.esat.kuleuven.be%2Fpsi%2Fspraak%2Fcgi-bin%2Fget_file.cgi%3F%2Fvstouten%2Fphd06%2Fphd_main.pdf&ret=j&q=Unscented%20Transform%20with%20Online%20Distortion%20Estimation%20for%20HMM%20Adaptation&ei=zohfTPbRJYXu0wTv9t3LBw&usg=AFOiCNHOaMjMLOsiB0ZCWnIOJoMe-fFU5w&cad=rja.
Michael L . Seltzer et al.: "Acoustic Model Adaptation via Linear Spline Interpolation for Robust Speech Recognition"—Published Date: 2010 http://research.microsoft.com/pubs/130977/0004550.pdf, pp. 1-4.

(Continued)

*Primary Examiner* — Jakieda Jackson
(74) *Attorney, Agent, or Firm* — Steve Spellman; Jim Ross; Micky Minhas (57) ABSTRACT

Noise and channel distortion parameters in the vectorized logarithmic or the cepstral domain for an utterance may be estimated, and subsequently the distorted speech parameters in the same domain may be updated using an unscented transformation framework during online automatic speech recognition. An utterance, including speech generated from a transmission source for delivery to a receiver, may be received by a computing device. The computing device may execute instructions for applying the unscented transformation framework to speech feature vectors, representative of the speech, in order to estimate, in a sequential or online manner, static noise and channel distortion parameters and dynamic noise distortion parameters in the unscented transformation framework. The static and dynamic parameters for the distorted speech in the utterance may then be updated from clean speech parameters and the noise and channel distortion parameters using non-linear mapping.

20 Claims, 4 Drawing Sheets

(56) References Cited

OTHER PUBLICATIONS

Yu Hu et al: "An HMM Compensation Approach for Dynamic Features Using Unscented Transformation and Its Application to Noisy Speech Recognition"—Published Date: Dec. 16-19, 2008, pp. 1-4. http://www.isca-speech.org/archive_open/archive_papers/iscslp2008/109.pdf.

Alex Acero: "HMM Adaptation Using Vector Taylor Series for Noisy Speech Recognition"—Retrieved Date: Aug. 9, 2010 http://research.microsoft.com/en-us/um/redmond/groups/srg/papers/2000-alexac-icslpb.pdf.

Jinyu Li et al.: "Unscented Transform with Online Distortion Estimation for HMM Adaptation"—Retrieved Date: Aug. 9, 2010, pp. 1 http://research.microsoft.com/apps/pubs/default.aspx?id=135390.

* cited by examiner

ONLINE DISTORTED SPEECH ESTIMATION WITHIN AN UNSCENTED TRANSFORMATION FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various online services utilize computer applications to perform automatic speech recognition ("ASR") in completing various voice-activated functions initiated from a user's computer, such as the processing of information queries. However, the accuracy of the ASR performed is limited by the robustness of the environment in which the speech recognition is taking place. For example, ambient noise caused by background speakers or automobiles may interfere with or distort user commands spoken in a microphone for transmission to the online service.

Previous solutions for addressing distortions in ASR have been directed to a model-domain approach that jointly compensates for additive and convolutive distortions ("JAC") in speech. In these previous solutions, a computer-based algorithm utilizes a parsimonious nonlinear physical model to describe the environmental distortion and further uses a vector Taylor series ("VTS") approximation technique to find closed-form hidden Markov model ("HMM") adaptation and noise/channel parameter estimation formulas to compensate for speech distortions. A drawback associated with the JAC-VTS model adaptation technique however, is that the same approximated linear mapping between clean and distorted speech model parameters is shared across the entire model space even though the true mapping is nonlinear. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for estimating noise and channel distortions and updating distorted speech parameters for an utterance, within an unscented transformation framework, during automatic speech recognition. The utterance may include speech generated from a transmission source for delivery to a receiver. The unscented transformation framework may be applied to speech to determine static distorted speech parameters and dynamic distorted speech parameters using non-linear mapping, given noise and channel distortion parameters. The distortion parameters can be estimated online in the same unscented transformation framework.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for estimating noise and channel distortions and updating distorted speech parameters for an utterance, within an unscented transformation framework, during automatic speech recognition. The utterance may include speech generated from a transmission source for delivery to a receiver. The unscented transformation framework may be applied to speech to determine static distorted speech parameters and dynamic distorted speech parameters using non-linear mapping, given noise and channel distortion parameters. The distortion parameters can be estimated online in the same unscented transformation framework.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
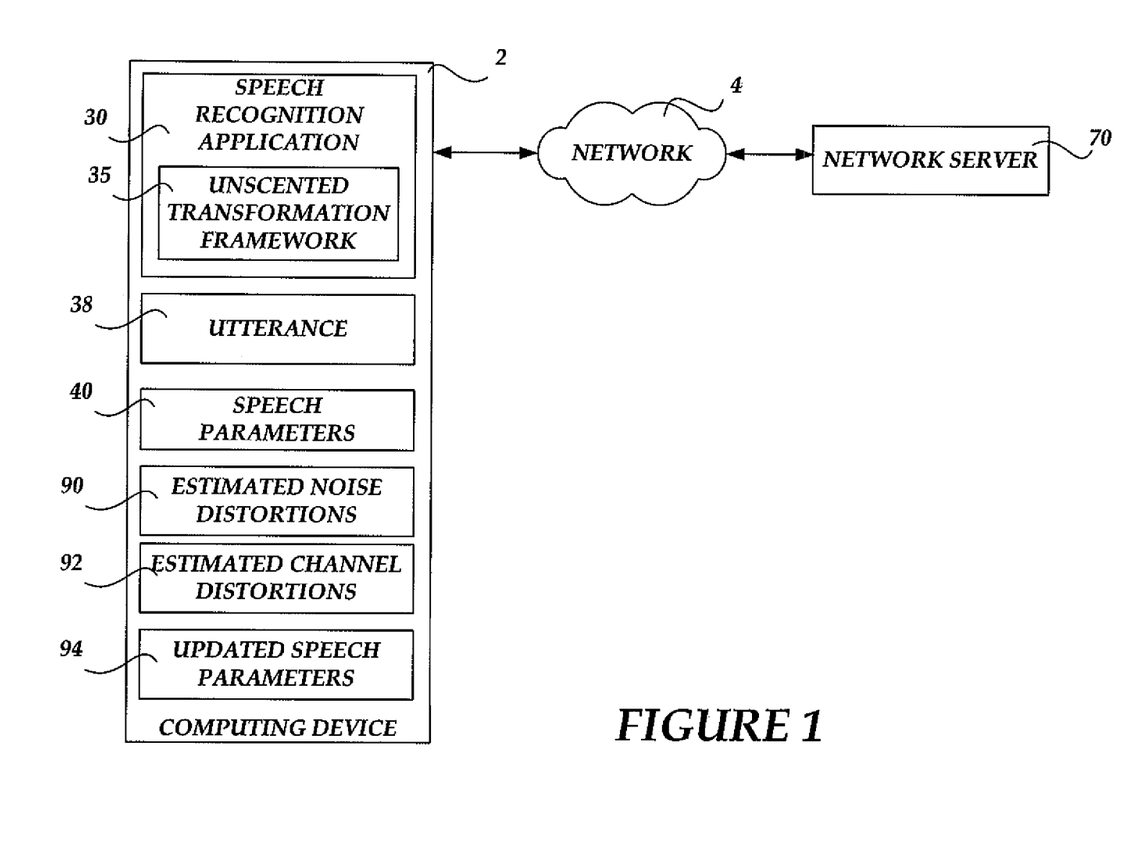
FIG. 1 is a block diagram illustrating a network architecture for estimating noise and channel distortions and updating distorted speech parameters for an utterance, within an unscented transformation framework, during automatic speech recognition, in accordance with various embodiments.

Referring now to the drawings, in which like numerals represent like elements through the several figures, various aspects of the present invention will be described. FIG. 1 is a block diagram illustrating a network architecture for e estimating noise and channel distortions and updating distorted speech parameters for an utterance, within an unscented transformation framework, during automatic speech recognition, in accordance with various embodiments. The network architecture includes a computing device 2 in communication with a network server 70 over a network 4. The computing device 2 may include a speech recognition application 30, an utterance 38, speech parameters 40, estimated noise distortions 90, estimated channel distortions 92 and updated speech parameters 94. In accordance with various embodiments, the client computing device 2 may include a computer capable of executing one or more application programs including, but not limited to, a desktop computer, a laptop computer, a tablet computer, a "smartphone" (i.e., a mobile phone having computer functionality and/or which is capable of running operating system software to provide a standardized interface and platform for application developers), and an automobile-based computing device.

The speech recognition application 30 in the client computing device 2 may comprise a software application which utilizes automatic speech recognition ("ASR") including, but not limited to, search engines (e.g., business search, stock quote search, sports scores, movie times, weather data, horoscopes, document search), navigation, voice activated dialing ("VAD"), automobile-based software (e.g., for turning a radio on or off, activating a cruise control function, temperature control, controlling video display functions, playing a "DVD"), device control functions (e.g., turning the client computing device 2 off, recording note, deleting/creating/moving files), messaging (e.g., text and MMS), media (e.g., taking a picture), and content. In accordance with an embodiment, the speech recognition application 30 may comprise the BING online services web search engine from MICROSOFT CORPORATION of Redmond, Wash. It should be appreciated, however, that other speech recognition application programs from other manufacturers may be utilized in accordance with the various embodiments described herein.

In accordance with an embodiment, the speech recognition application 30 may comprise an unscented transformation framework 35. As will be described in greater detail below, the speech recognition application 30 may be configured to estimate noise and channel distortions and update distorted speech parameters for an utterance, within the unscented transformation framework 35, during ASR. In accordance with an embodiment, the unscented transformation framework 35 may comprise an unscented transformation ("UT") algorithm embedded into a "JAC" function (i.e., a function that jointly compensates for additive and convolutive distortions in speech) thereby forming a combined JAC-UT algorithm. The JAC-UT algorithm will be described in greater detail below with respect to FIG. 4.

In accordance with an embodiment, the utterance 38 may comprise speech generated from a transmission source for delivery to a receiver. For example, a user of the computing device 2 may use an attached microphone to initiate a search query for transmission from the computing device 2 to the network server 70 over the network 4.

In accordance with an embodiment, the speech parameters 40 may be utilized in the unscented transformation framework 35 and may represent different aspects of speech contained within the utterance 38. The speech parameters 40 will be described in greater detail below with respect to FIG. 2.

In accordance with an embodiment, the estimated noise distortions 90 and the estimated channel distortions 92 may comprise estimates of noise and channel distortions contained in the utterance 38, as determined from the speech parameters 40. As should be understood by those skilled in the art, a "channel" represents the speech transmission path of an utterance between the speaker of the utterance and a device used to capture the speech (e.g., a microphone). A channel may also represent the speech transmission path of an utterance between the device used to capture the speech and a final destination of the utterance (e.g., the recipient of the utterance). Thus, a channel distortion may include any distortions determined in the aforementioned speech transmission paths.

The computing device 2 may communicate with the network server 70 over the network 4 which may include a local network or a wide area network (e.g., the Internet). In accordance with an embodiment, the network server 70 may comprise one or more computing devices for receiving the utterance 38 from the computing device 2 and for sending an appropriate response thereto (e.g., the network server 70 may be configured to send results data in response to a query received in an utterance from the computing device 2).

Figure 2:
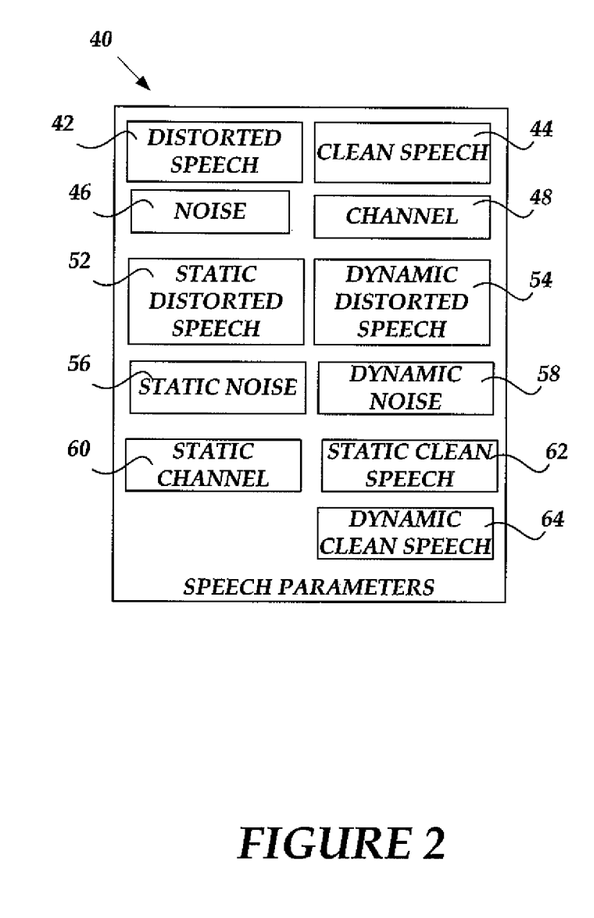
FIG. 2 is a block diagram illustrating various speech parameters utilized in estimating noise and channel distortions and updating distorted speech parameters for an utterance, within an unscented transformation framework, during automatic speech recognition, in accordance with various embodiments.

FIG. 2 is a block diagram illustrating various parameters in the speech parameters 40 which are utilized in determining the estimated noise distortions 90, the estimated channel distortions 92 and the updated speech parameters 94, in accordance with various embodiments. The speech parameters 40 may include a distorted speech parameter 42, a clean speech parameter 44, a noise parameter 46, a channel parameter 48, static distorted speech parameters 52, dynamic distorted speech parameters 54, static noise parameters 56, dynamic noise parameters 58, static channel parameters 60, static clean speech parameters 62 and dynamic clean speech parameters 64. As defined herein, the distorted speech parameter 42 represents the portion of the utterance 38 which includes noise distortions present in the final speech received by the network server 70 from the computing device 2. The clean speech parameter 44 represents the portion of the utterance 38 which includes no noise or channel distortions. The noise parameter 46 represents the portion of the utterance 38 which includes noise present in the environment of the speaker of the utterance 38 as the utterance 38 is being made by a speaker into the computing device 2 for delivery to the network server 70. The channel parameter 48 represents the speech transmission path of the utterance 38 between the speaker of the utterance 38 and a device used to capture the speech (e.g., a microphone) at the computing device 2. The channel parameter 48 may also represent the speech transmission path of the utterance 38 between the computing device 2 and the network server 70. As will be described in greater detail below with respect to FIG. 4, the static distorted speech parameters 52, the dynamic distorted speech parameters 54, the static noise parameters 56, the dynamic noise parameters 58, the static channel parameters 60, the static clean speech parameters 62 and the dynamic clean speech parameters 64 are determined utilizing the unscented transformation framework 35 (i.e., the JAC-UT algorithm) which is also utilized for determining the estimated noise distortions 90, the estimated channel distortions 92 and the updated speech parameters 94, in the utterance 38.

Exemplary Operating Environment

Figure 3:
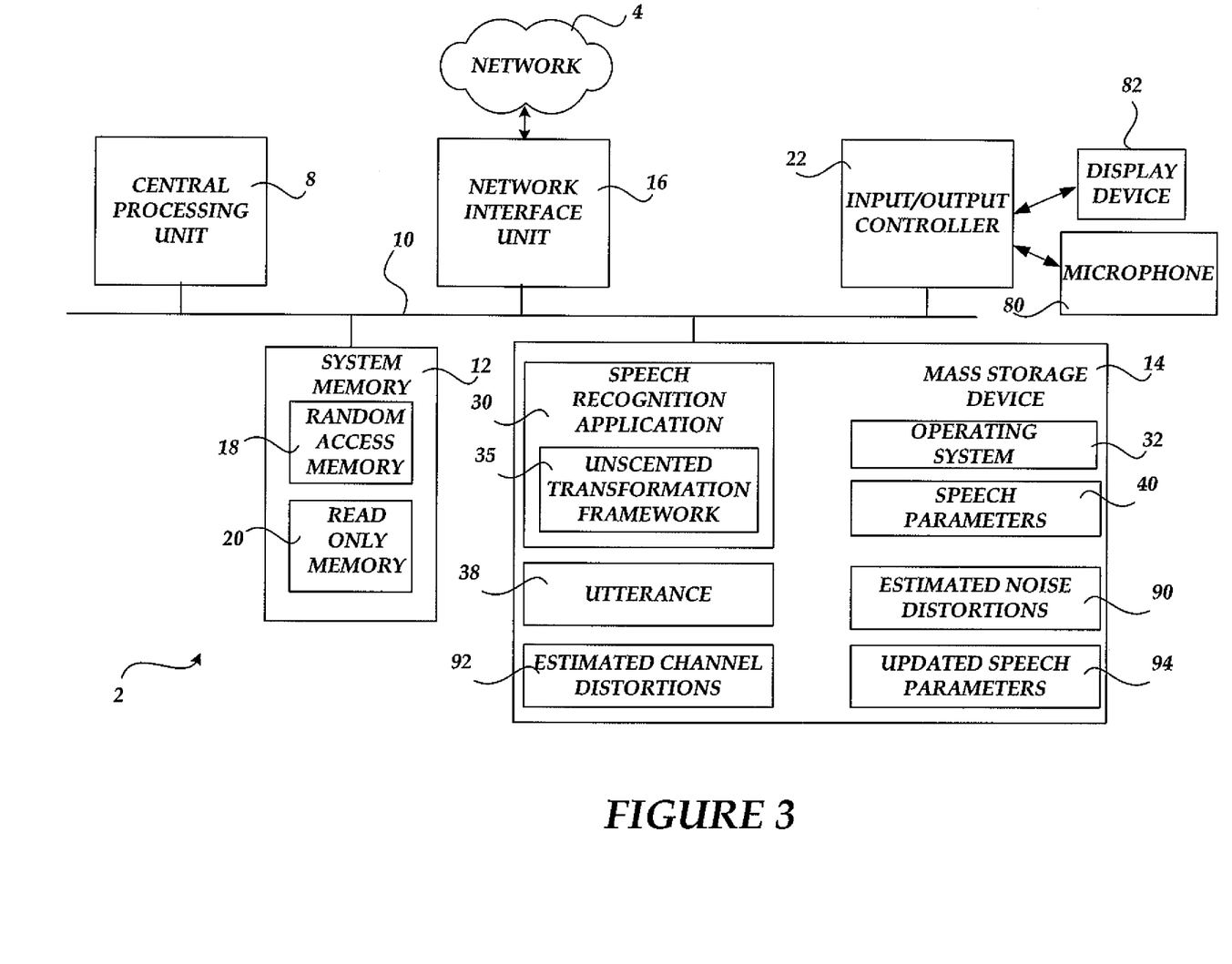
FIG. 3 is a block diagram illustrating a client computing environment which may be utilized for estimating noise and channel distortions and updating distorted speech parameters for an utterance, within an unscented transformation framework, during automatic speech recognition, in accordance with various embodiments.

Referring now to FIG. 3, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 3 shows the computing device 2 which may include a mobile or portable computer or other type of computer capable of executing one or more application programs including, but not limited to, a desktop computer, a laptop computer, a tablet computer, a "smartphone" (i.e., a mobile phone having computer functionality and/or which is capable of running operating system software to provide a standardized interface and platform for application developers), and an automobile-based computing device. The computing device 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computing device 2 further includes a mass storage device 14 for storing an operating system 32, the speech recognition application 30, the utterance 38, the speech parameters 40, the distorted speech statistics 90, the noise statistics 92 and the channel statistics 94.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the computing device 2. The term computer-readable media as used herein may include computer storage media. Computer storage media may include volatile and nonvolatile, removable and non-removable media implemented in any method or technology for storage of information, such as computer readable instructions, data structures, program modules, or other data. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 2. Any such computer storage media may be part of the computing device 2.

The term computer-readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments of the invention, the computing device 2 may operate in a networked environment using logical connections to remote computers through the network 4 which, as discussed above, may include a local network or a wide area network (e.g., the Internet). The computing device 2 may connect to the network 4 through a network interface unit 16 connected to the bus 10. It should be appreciated that the network interface unit 16 may also be utilized to connect to other types of networks and remote computing systems. The computing device 2 may also include the input/output controller 22 for receiving and processing input from a number of input types, including a microphone 80 as well as a keyboard, mouse, pen, stylus, finger, and/or other means (not shown). Similarly, an input/output controller 22 may provide output to a display device 82 as well as a printer, or other type of output device (not shown).

Figure 4:
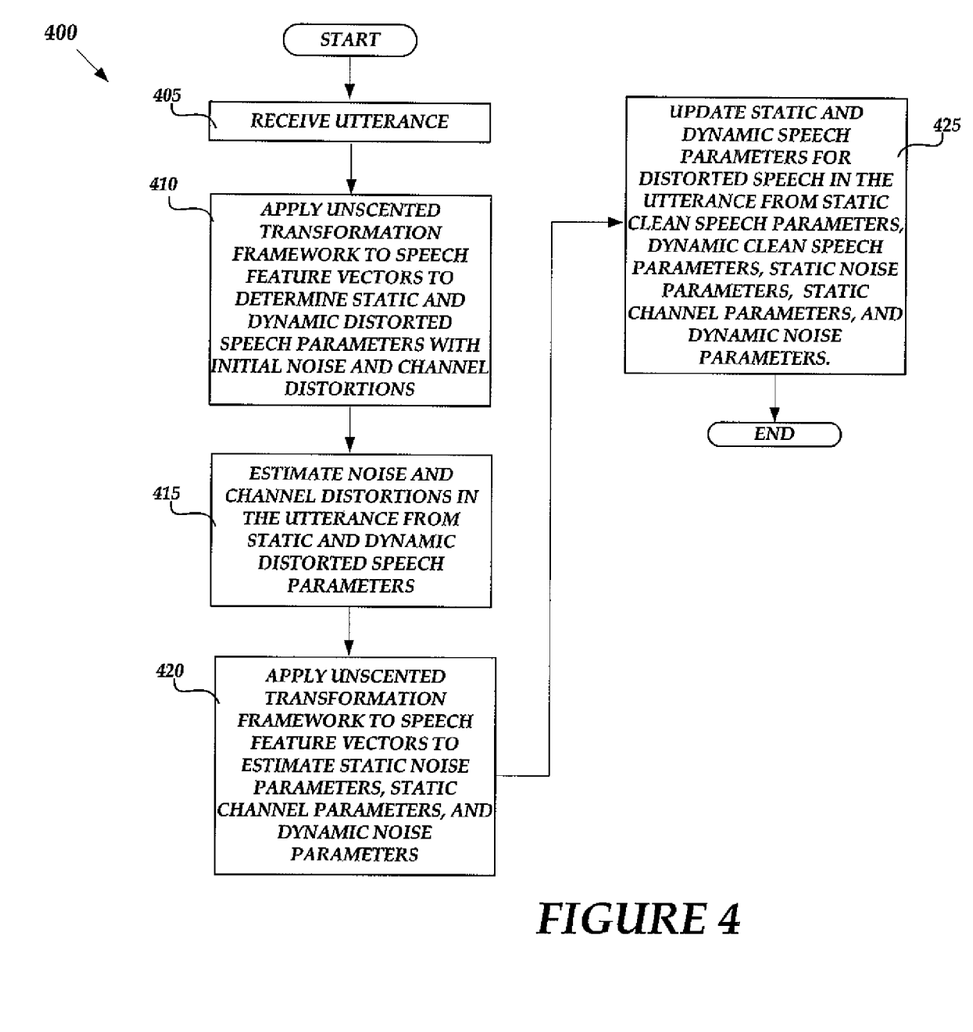
FIG. 4 is a flow diagram illustrating a routine for estimating noise and channel distortions and updating distorted speech parameters for an utterance, within an unscented transformation framework, during automatic speech recognition, in accordance with various embodiments.

FIG. 4 is a flow diagram illustrating a routine for estimating noise and channel distortions and updating distorted speech parameters for an utterance, within an unscented transformation framework, during automatic speech recognition, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where the speech recognition application 30, executing on the computing device 2, receives the utterance 38. For example, a user of the computing device 2 may deliver the utterance 38 into the microphone 80 (see FIG. 3) of the computing device 2, for delivery to the network server 70, in order to initiate a search query.

From operation 405, the routine 400 continues to operation 410, where the speech recognition application 30, executing on the computing device 2, applies the unscented transformation framework 35 to speech parameters (i.e., speech feature vectors) representative of the speech in the received utterance 38, to determine the static distorted speech parameters 52 and the dynamic distorted speech parameters 54. The unscented transformation framework 35 utilizes non-linear mapping, as will be discussed in greater detail below. In accordance with an embodiment, the static distorted speech parameters 52 and the dynamic distorted speech parameters 54 may be determined with initial noise and channel distortions. For example, initial noise distortions may include speech parameters which are initialized by averaging a predetermined number of frames (e.g., 20 frames) at the beginning and ending of a current utterance. Initial channel distortions may include channel distortion mean parameters which are set to a zero value.

In accordance with an embodiment, distorted speech may be represented by the parameter or speech feature vector "y" in a cepstral domain. As should be understood by those skilled in the art, a cepstral domain refers to a Fourier transform logarithm. For example, a JAC formulation for the distorted speech parameter may be represented as the following non-linear function:

$$y = x + h + C \log(1 + \exp(C^{-1}(n - x - h))).$$

where "x" represents a clean speech parameter or speech feature vector, "n" represents a noise parameter or speech feature vector and "h" represents a channel parameter or speech feature vector. In determining the static distorted speech parameters 52 and the dynamic distorted speech parameters 54, the speech recognition application 30 may utilize the unscented transformation framework 35 to determine a static transformed mean (i.e., a static transformed speech feature mean vector or the mean of the transformed static features) and a static transformed variance (i.e., a static transformed speech feature variance or the variance of the transformed static features), a dynamic mean (i.e., the mean of the transformed dynamic features), and a dynamic variance (i.e., the variance of the transformed dynamic feature) of distorted speech received in the utterance 38. It should be understood that the static transformed speech feature variance (discussed above) may comprise elements of a diagonal covariance matrix, in accordance with an embodiment. As discussed above, the unscented transformation framework 35 may be formed by embedding a UT algorithm into a JAC function. In accordance with an embodiment, the UT algorithm may be determined as follows:

1. Basic UT Algorithm

An augmented signal (i.e., a speech signal representing the utterance 38) $s=[x^T, n^T]^T$ is formed with a D-dimensional clean speech cepstrum x and a noise cepstrum n, with dimensionality $D_s=D_x+D_n=2D$. The UT algorithm samples the augmented signal s with 4D sigma points:

$$s_i \begin{cases} \mu_s + (\sqrt{2D\Sigma_s})_i, & \text{if } i = 1 \ldots 2D \\ \mu_s - (\sqrt{2D\Sigma_s})_{i-2D}, & \text{if } i = 2D+1 \ldots 4D, \end{cases}$$

where $\mu_s$ and $\Sigma_s$ are the mean and covariance of the augmented signal, and $(\sqrt{\Sigma})_i$ denotes the i-th column of the square root matrix of $\Sigma$. In the feature space, the transformed sample $z_j$ with a non-linear mapping function $f(.)$ is $z_i = f(s_i)$. In the model space, the mean and variance values are:

$$\mu_y = \sum_{i=0}^{4D} w_i z_i, \quad (1)$$

$$\sum_y = \sum_{i=0}^{4D} w_i (z_i - \mu_y)(z_i - \mu_y)^T, \quad (2)$$

where $w_i = 1/4D$ are weights of each sigma point.

In accordance with an embodiment, the UT algorithm may embedded into a JAC function to determine a JAC-UT Algorithm (i.e., the unscented transformation framework 35) as follows:

2. JAC-UT Algorithm $$z_i = f(s_i) = f(x_i^T, n_i^T) = x_i + h + C\log(1 + \exp(C^{-1}(n_i - x_i - h))),$$

where $x_i = \mu_x + \delta_{xi}$ and $n_i = \mu_n + \delta_{ni}$, with $\delta_{xi}$ and $\delta_{ni}$ being the offsets of $x_i$ and $n_i$ from $\mu_x$ and $\mu_n$, respectively.

Static transformed mean values are obtained as follows:

$$\mu_y = \sum_{i=1}^{4D} w_i z_i$$

$$= \Sigma w_i(\mu_x + \delta_{xi} + \mu_h + C\log(1 + \exp(C^{-1}(\mu_n + \delta_{ni} - \mu_x - \delta_{xi} - \mu_h))))$$

$$= \Sigma w_i \mu_x + \Sigma w_i \delta_{xi} + \Sigma w_i \mu_h +$$

$$\Sigma w_i C\log(1 + \exp(C^{-1}(\mu_n + \delta_{ni} - \mu_x - \delta_{xi} - \mu_h)))$$

$$= \mu_x + \mu_h \Sigma w_i C\log(1 + \exp(C^{-1}(\mu_n + \delta_{ni} - \mu_x - \delta_{xi} - \mu_h)))$$

$$= \mu_x + \mu_h + g'(\mu_x, \mu_h, \mu_n),$$

where $$g'(\mu_x, \mu_h, \mu_n) = \Sigma w_i C\log(1 + \exp(C^{-1}(\mu_n + \delta_{ni} - \mu_x - \delta_{xi} - \mu_h))).$$

The static transformed variance $\Sigma_y$ may be calculated with Eq. (2) (shown above in the preceding paragraph). The derivatives of $\mu_y$ with respect to $\mu_x$ and $\mu_h$ may be determined as follows:

$$G' = \frac{\partial \mu_y}{\partial \mu_y}$$

$$= \frac{\partial \mu_y}{\partial \mu_h}.$$

$$= I - \Sigma w_i C diag\{\exp(C^{-1}(\mu_n + \delta_{ni} - \mu_x - \delta_{xi} - \mu_h))/$$

$$(1 + \exp[C^{-1}(\mu_n + \delta_{ni} - \mu_x - \delta_{xi} - \mu_h)])\}C^{-1}$$

$$= \Sigma w_i C diag\{1/(1 + \exp[C^{-1}(\mu_n + \delta_{ni} - \mu_x - \delta_{xi} - \mu_h)])\}C^{-1}.$$

and to $\mu_n$ as $$\frac{\partial \mu_y}{\partial \mu_n} = I - G'.$$

It should be appreciated that a difference between the JAC-UT algorithm (discussed above) and prior art methods (e.g., the JAC-VTS algorithm), is that the sampling utilized in the JAC-UT algorithm makes the parameter estimation of distorted speech more reliable because of the use of non-linear mapping. The dynamic mean and variance parameters may be determined as follows:

$$\mu_{\Delta y} \approx G' \mu_{\Delta x},$$

$$\mu_{\Delta\Delta y} \approx G' \mu_{\Delta\Delta x},$$

$$\Sigma_{\Delta y} \approx G' \Sigma_{\Delta x} G'^T + (I-G')\Sigma_{\Delta n}(I-G')^T,$$

$$\Sigma_{\Delta\Delta y} \approx G' \Sigma_{\Delta\Delta x} G'^T + (I-G')\Sigma_{\Delta\Delta n}(I-G')^T,$$

From operation 410, the routine 400 continues to operation 415, where the speech recognition application 30, executing on the computing device 2, estimates noise and channel distortions in the utterance 38 from the static distorted speech parameters 52 and the dynamic distorted speech parameters 54, determined by the unscented transformation framework 35, at operation 410. In particular, and as described in greater detail below at operation 420, the noise and channel distortions in the utterance 38 may be determined by applying the unscented transformation framework 35 to the speech feature vectors to estimate the static noise parameters 56, the static channel parameters 60, and the dynamic noise parameters 58.

From operation 415, the routine 400 continues to operation 420, where the speech recognition application 30, executing on the computing device 2, applies the unscented transformation framework 35 to the speech feature vectors to estimate the static noise parameters 56, the static channel parameters 60, and the dynamic noise parameters 58. In determining the aforementioned parameters, the speech recognition application 30 may utilize the unscented transformation framework 35 to determine a static transformed mean and a static transformed variance of noise received in the utterance 38, a static mean of the channel distortions received in the utterance 38, and a dynamic mean and a dynamic variance of the noise received in the utterance 38. The JAC-UT algorithm may be applied as follows to determine the aforementioned static and dynamic means and variances:

In the JAC-UT algorithm, $\gamma_t(j, k)$ is set to denote the posterior probability for the k-th Gaussian in the j-th state of a Hidden Markov Model ("HMM"), i.e., $$\gamma_t(j,k) = p(\theta_t=j, \epsilon_t=k | Y, \bar{\lambda}),$$

where $\theta_t$ denotes the state index, and $\epsilon_t$ denotes the Gaussian index at time frame t $\bar{\lambda}$ is an old parameter set of noise and channel. It should be understood that the time frame referenced in the above algorithm may comprise a discretized amount of time for processing speech by the speech recognition application 30. For example, a time frame in accordance with an embodiment may comprise ten milliseconds of speech. In accordance with an embodiment, the old parameter set of noise and channel referenced by $\bar{\lambda}$ in the above algorithm may comprise initial values of noise and channel distortions in the utterance 38 (i.e., zero values). As should be understood by those skilled in the art, an HMM is a statistical Markov model in which the system being modeled is assumed to be a Markov process with unobserved (hidden) states. An HMM can be considered as the simplest dynamic Bayesian network. HMMs are commonly used in speech recognition systems to help to determine the words represented by the sound waveforms captured from an utterance. Continuing with the description of the above algorithm, $\mu_y$ is then embedded into an expectation-maximization ("EM") auxiliary function. As should be understood by those skilled in the art, an EM algorithm is a statistical a method for finding maximum likelihood or maximum a posteriori ("MAP") estimates of parameters in statistical models, where the model depends on unobserved latent variables. EM is an iterative method which alternates between performing an expectation ("E") step, which computes the expectation of the log-likelihood evaluated using the current estimate for the latent variables, and a maximization ("M") step, which computes parameters maximizing the expected log-likelihood found on the E step. These parameter-estimates are then used to determine the distribution of the latent variables in the next E step. Continuing with the description of the above algorithm, a first derivative is then taken with respect to $\mu_n$ and $\mu_h$, to obtain the following:

$$\frac{\partial Q}{\partial \mu_n} \sim \sum_t \sum_j \sum_k \gamma_t(j,k)(I - G'(j,k))^T \sum_{y,jk}^{-1} (\gamma_t - \mu_{y,jk}) = 0,$$

and $$\frac{\partial Q}{\partial \mu_n} \sim \sum_t \sum_j \sum_k \gamma_t(j,k) G'(j,k)^T \sum_{y,jk}^{-1} (\gamma_t - \mu_{y,jk}) = 0.$$

Because $\mu_y$ is a nonlinear function of $\mu_n$ and $\mu_h$, the function is linearized as $$\mu_y = \mu_x + \mu_{h,0} + G^{\prime(\mu_n - \mu_{h,0})} + (I - G')(\mu_n - \mu_{n,0})$$

thereby obtaining a closed-form solution as:

$$\mu_n = \mu_{n,0} + \left\{ \sum_t \sum_j \sum_k \gamma_t(j,k)(I - G'(j,k))^T \sum_{y,jk}^{-1} (I - G'(j,k)) \right\}^{-1}$$

$$\left\{ \sum_t \sum_j \sum_k \gamma_t(j,k)(I - G'(j,k))^T \right.$$

$$\left. \sum_{y,jk}^{-1} (\gamma_t - \mu_{x,jk} - \mu_{h,0} - g'(\mu_{n,0}, \mu_{x,jk}, \mu_{h,0})) \right\}.$$

$$\mu_h = \mu_{h,0} + \left\{ \sum_t \sum_j \sum_k \gamma_t(j,k) G'(j,k)^T \sum_{y,jk}^{-1} G'(j,k) \right\}^{-1}$$

$$\left\{ \sum_t \sum_j \sum_k \gamma_t(j,k) G'(j,k)^T \right.$$

$$\left. \sum_{y,jk}^{-1} (\gamma_t - \mu_{x,jk} - \mu_{h,0} - g'(\mu_{n,0}, \mu_{x,jk}, \mu_{h,0})) \right\}.$$

From operation 420, the routine 400 continues to operation 425, where the speech recognition application 30, executing on the computing device 2, updates the static distorted speech parameters 52 and the dynamic distorted speech parameters 54 for the distorted speech 42 in the utterance 38 from the static clean speech parameters 62, the dynamic clean speech parameters 64, the static noise parameters 56, the static channel parameters 60, and the dynamic noise parameters 58. It should be understood that, in the above equations representing the JAC-UT algorithm, the static clean speech parameters 62 may be represented by the parameter $\mu_x$ and the dynamic clean speech parameters 64 may be represented by the parameter $\mu_{\Delta x}$. From operation 425, the routine 400 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of estimating noise and channel distortions and updating distorted speech parameters for an utterance, within an unscented transformation framework, during automatic speech recognition, comprising:

receiving, by the computer, the utterance, wherein the utterance comprises speech generated from a transmission source for delivery to a receiver;

applying, by the computer, the unscented transformation framework to speech feature vectors representative of the speech, to determine static distorted speech parameters and dynamic distorted speech parameters with initial noise and channel distortions, the initial noise distortions comprising speech parameters which are initialized by averaging a predetermined number of frames at the beginning and ending of the utterance, wherein the unscented transformation framework utilizes non-linear mapping; and estimating, by the computer, noise and channel distortions in the utterance from the static distorted speech parameters and the dynamic distorted speech parameters.

2. The method of claim 1, further comprising:
applying the unscented transformation framework to the speech feature vectors to estimate static noise parameters, static channel parameters, and dynamic noise parameters; and
updating the static distorted speech parameters and the dynamic distorted speech parameters for the distorted speech in the utterance from static clean speech parameters, dynamic clean speech parameters, the static noise parameters, the static channel parameters, and the dynamic noise parameters.

3. The method of claim 2, wherein applying the unscented transformation framework to the speech feature vectors to determine static noise parameters, static channel parameters, and dynamic noise parameters comprises:
determining at least one static transformed mean utilizing the non-linear function corresponding to the speech in the utterance; and
determining at least one static transformed variance utilizing the non-linear function corresponding to the speech in the utterance.

4. The method of claim 3, wherein applying the unscented transformation framework to the speech feature vectors to determine static noise parameters, static channel parameters, and dynamic noise parameters further comprises:
determining at least one dynamic mean utilizing the non-linear function corresponding to the speech in the utterance; and
determining at least one dynamic variance of the noise parameter utilizing the non-linear function corresponding to the speech in the utterance.

5. The method of claim 1, wherein applying, by the computer, the unscented transformation framework to the speech feature vectors to determine static distorted speech parameters and dynamic distorted speech parameters comprises:
determining a static transformed mean utilizing a non-linear function corresponding to the speech in the utterance, the static transformed mean comprising a static transformed speech feature mean vector; and
determining a static transformed variance, the static transformed variance comprising a static transformed speech feature variance, the static transformed speech feature variance comprising elements of a diagonal covariance matrix, utilizing the non-linear function corresponding to the speech in the utterance.

6. The method of claim 5, wherein applying, by the computer, the unscented transformation framework to the speech feature vectors to determine static distorted speech parameters and dynamic distorted speech parameters further comprises:
determining a dynamic mean utilizing the non-linear function corresponding to the speech in the utterance; and
determining a dynamic variance utilizing the non-linear function corresponding to the speech in the utterance.

7. The method of claim 1, wherein receiving, by the computer, the utterance, comprises receiving one or more of clean speech, noise, channel distortion and distorted speech.

8. A computer system for estimating noise and channel distortions and updating distorted speech parameters for an utterance, within an unscented transformation framework, during automatic speech recognition, comprising:
a memory for storing executable program code; and
a processor, functionally coupled to the memory, the processor being responsive to computer-executable instructions contained in the program code and operative to:
receive the utterance, wherein the utterance comprises speech generated from a transmission source for delivery to a receiver;
apply the unscented transformation framework to speech feature vectors representative of the speech, to determine static distorted speech parameters and dynamic distorted speech parameters with initial noise and channel distortions, the initial noise distortions comprising speech parameters which are initialized by averaging a predetermined number of frames at the beginning and ending of the utterance, wherein the unscented transformation framework utilizes non-linear mapping; and
estimate noise and channel distortions in the utterance from the static distorted speech parameters and the dynamic distorted speech parameters.

9. The system of claim 8, wherein the processor is further operative to:
apply the unscented transformation framework to the speech feature vectors to estimate static noise parameters, static channel parameters, and dynamic noise parameters; and
update the static distorted speech parameters and the dynamic distorted speech parameters in the utterance from static clean speech parameters, dynamic clean speech parameters, the static noise parameters, the static channel parameters, and the dynamic noise parameters.

10. The system of claim 9, wherein the processor, in applying the unscented transformation framework to the speech feature vectors to determine static noise parameters, static channel parameters, and dynamic noise parameters, is operative to:
determine at least one static transformed mean utilizing the non-linear function corresponding to the speech in the utterance; and
determine at least one static transformed variance utilizing the non-linear function corresponding to the speech in the utterance.

11. The system of claim 10, wherein the processor, in applying the unscented transformation framework to the speech feature vectors to determine static noise parameters, static channel parameters, and dynamic noise parameters, is further operative to:
determine at least one dynamic mean utilizing the non-linear function corresponding to the speech in the utterance; and
determine at least one dynamic variance of the noise parameter utilizing the non-linear function corresponding to the speech in the utterance.

12. The system of claim 8, wherein the processor, in the unscented transformation framework to the speech feature vectors to determine static distorted speech parameters and dynamic distorted speech parameters, is operative to:
determine a static transformed mean utilizing a non-linear function corresponding to the speech in the utterance, the static transformed mean comprising a static transformed speech feature mean vector; and
determine a static transformed variance utilizing the non-linear function corresponding to the speech in the utterance, the static transformed speech feature variance comprising elements of a diagonal covariance matrix, utilizing the non-linear function corresponding to the speech in the utterance.

13. The system of claim 12, wherein the processor, in the unscented transformation framework to the speech feature vectors to determine static distorted speech parameters and dynamic distorted speech parameters, is further operative to:
determine a dynamic mean utilizing the non-linear function corresponding to the speech in the utterance; and
determine a dynamic variance utilizing the non-linear function corresponding to the speech in the utterance.

14. The system of claim 8, wherein the processor, in receiving the utterance, is operative to receive one or more of clean speech, noise, channel distortion and distorted speech.

15. A computer-readable storage device storing computer executable instructions which, when executed on a computer, will cause the computer to perform a method of estimating noise and channel distortions and updating distorted speech parameters for an utterance, within an unscented transformation framework, during automatic speech recognition, the method comprising:
receiving the utterance, wherein the utterance comprises speech generated from a transmission source for delivery to a receiver, the utterance comprising one or more of clean speech, noise, channel distortion and distorted speech;
applying the unscented transformation framework to speech feature vectors representative of the speech, to determine static distorted speech parameters and dynamic distorted speech parameters with initial noise and channel distortions, the initial noise distortions comprising speech parameters which are initialized by averaging a predetermined number of frames at the beginning and ending of the utterance, wherein the unscented transformation framework utilizes non-linear mapping; and
estimating noise and channel distortions in the utterance from the static distorted speech parameters and the dynamic distorted speech parameters.

16. The computer-readable storage device of claim 15, further comprising:
applying the unscented transformation framework to the speech feature vectors to estimate static noise parameters, static channel parameters, and dynamic noise parameters; and
updating the static distorted speech parameters and the dynamic distorted speech parameters for the distorted speech in the utterance from static clean speech parameters, dynamic clean speech parameters, the static noise parameters, the static channel parameters, and the dynamic noise parameters.

17. The computer-readable storage device of claim 16, wherein applying the unscented transformation framework to the speech feature vectors to determine static noise parameters, static channel parameters, and dynamic noise parameters comprises:
determining at least one static transformed mean utilizing the non-linear function corresponding to the speech in the utterance; and
determining at least one static transformed variance utilizing the non-linear function corresponding to the speech in the utterance.

18. The computer-readable storage device of claim 17, wherein applying the unscented transformation framework to the speech feature vectors to determine static noise parameters, static channel parameters, and dynamic noise parameters further comprises:
determining at least one dynamic mean utilizing the non-linear function corresponding to the speech in the utterance; and
determining at least one dynamic variance of the noise parameter utilizing the non-linear function corresponding to the speech in the utterance.

19. The computer-readable storage device of claim 15, wherein applying the unscented transformation framework to the speech feature vectors to determine static distorted speech parameters and dynamic distorted speech parameters comprises:
determining a static transformed mean utilizing a non-linear function corresponding to the speech in the utterance, the static transformed mean comprising a static transformed speech feature mean vector; and
determining a static transformed variance, the static transformed variance comprising a static transformed speech feature variance, the static transformed speech feature variance comprising elements of a diagonal covariance matrix, utilizing the non-linear function corresponding to the speech in the utterance.

20. The computer-readable storage device of claim 19, wherein applying the unscented transformation framework to the speech feature vectors to determine static distorted speech parameters and dynamic distorted speech parameters further comprises:
determining a dynamic mean utilizing the non-linear function corresponding to the speech in the utterance; and
determining a dynamic variance utilizing the non-linear function corresponding to the speech in the utterance.

* * * * *